(12) United States Patent
Williams

(10) Patent No.: US 6,918,055 B2
(45) Date of Patent: Jul. 12, 2005

(54) SERVICE OPERATIONS ON A COMPUTER SYSTEM

(75) Inventor: Emrys Williams, Eversholt (GB)

(73) Assignee: Sun Microsystems, Inc., Santa Clara, CA (US)

(*) Notice: Subject to any disclaimer, the term of this patent is extended or adjusted under 35 U.S.C. 154(b) by 526 days.

(21) Appl. No.: 10/106,395

(22) Filed: Mar. 26, 2002

(65) Prior Publication Data

US 2004/0078721 A1 Apr. 22, 2004

(51) Int. Cl.⁷ ................................................ G06F 11/00
(52) U.S. Cl. ..................................... 714/27; 709/392.9
(58) Field of Search ............................ 714/27, 57, 46; 705/9; 379/9.02

(56) References Cited

U.S. PATENT DOCUMENTS

| | | | | |
|---|---|---|---|---|
| 5,321,242 | A | * | 6/1994 | Heath, Jr. .................... 235/382 |
| 6,144,848 | A | * | 11/2000 | Walsh et al. ................. 455/419 |
| 6,145,101 | A | * | 11/2000 | Pike ............................ 714/46 |
| 2002/0107716 | A1 | * | 8/2002 | Callahan et al. ............... 705/9 |
| 2002/0129305 | A1 | * | 9/2002 | Ahrens et al. ................ 714/57 |
| 2004/0049405 | A1 | * | 3/2004 | Buerger et al. ................ 705/1 |

\* cited by examiner

*Primary Examiner*—Bryce P. Bonzo
(74) *Attorney, Agent, or Firm*—Meyertons Hood Kivlin Kowert & Goetzel, P.C.; B. Noël Kivlin

(57) ABSTRACT

The invention relates to performing a service operation on a computer. In one embodiment, information indicative of the need for a service operation is sent by a customer computer to a support center. Based on this received information, the support center then identifies the service operation to be performed on the computer, such as the replacement of a faulty component. The support center then creates a service task record describing this service operation, which is transmitted from the support center to a mobile computing device associated with an engineer who is to complete the service operation. This typically includes schedule information, detailing when and where the service operation is to be performed. When the engineer then arrives at the customer location, a direct communication link is established between the customer computer to be serviced and the mobile computing device, for example using an infrared link. Information transmitted over this link allows the mobile computing device and the customer computer to confirm with one another the details of the service operation to be performed, such as which particular component of the computer is to be replaced. This minimises the likelihood of mistakes being made during the service operation. Finally, a confirmation that the repair has been completed can be transmitted from the mobile computing device and/or the customer computer itself back to the support center.

65 Claims, 8 Drawing Sheets

SERVICE OPERATIONS ON A COMPUTER SYSTEM

FIELD OF THE INVENTION

The present invention relates to the performance of a service operation on a computer system in response to the receipt at a support centre of diagnostic information from the computer system. The service operation is performed by an engineer having a mobile computing device.

BACKGROUND OF THE INVENTION

Modern computer systems often comprise many components interacting with one another in a highly complex fashion. For example, a server installation may include multiple processors, configured either within their own individual (uniprocessor) machines, or combined into one or more multiprocessor machines. These systems operate in conjunction with associated memory and disk drives for storage, video terminals and keyboards for input/output, plus interface facilities for data communications over one or more networks. The skilled person will appreciate that many additional components may also be present.

The ongoing maintenance of such complex systems can be an extremely demanding task. Typically various hardware and software components need to be upgraded and/or replaced, and general system administration tasks must also be performed, for example to accommodate new uses or users of the system. There is also a need to be able to detect and diagnose faulty behaviour, which may arise from either software or hardware problems.

One known mechanism for simplifying the system management burden is to provide a single point of control from which the majority of control tasks can be performed. This can be provided with a video monitor and/or printer, to which diagnostic and other information can be directed, and also a keyboard or other input device to allow the operator to enter desired commands into the system. Such a centralised approach generally reduces the burden on the system operator, compared to having to individually interact with all the different processors or machines in the installation. In particular, the operator typically only needs to monitor diagnostic information at one output in order to confirm whether or not the overall system is operating properly, rather than having to individually check the status of each particular component.

It is also known to provide remote diagnostic facilities, whereby a computer installation can automatically send data about its current status and operation to a remote location that is typically manned by support staff from the manufacturer of the computer or software or other appropriate service personnel. Such personnel frequently have expertise that is not available directly to the owner or user of the computer system on-site, as well as benefiting from economies of scale. Moreover, such a service centre may be operational for extended periods of time, including providing 24×7 support in some circumstances. Note that one way of achieving such round-the-clock coverage is to provide support centres that are geographically spread, so that they are located in different time zones across the world. Consequently, it may be necessary for a computer installation to communicate with more than one support centre (although the relevant switching may be performed by the service provider transparently to the customer). In addition, a computer installation may also be connected to different support bureaux in relation to the various components of the system (such as one for hardware and one for software).

Although remote support can be extremely sophisticated and useful, it cannot address all possible situations. One immediately apparent reason for this is that new hardware (unlike new software) cannot be downloaded over a computer network, but rather must be physically installed at the customer location. In addition, there may well be circumstances in which software components cannot be installed or upgraded remotely, for example because of basic limitations in the machine architecture, or because of defects in the existing software (such as the communications software itself not functioning properly and so being in need of maintenance).

Another reason for restrictions on remote operation is for security purposes. Thus allowing remote software access to a machine potentially compromises the security of machine, and provides hackers or other external agents with a possible route to gain access into the machine. Although software systems are of course designed to protect against such intrusions, limiting the ability of remote users to significantly modify or control a computer installation acts as a further level of defence. Thus there may be many software maintenance tasks that are only permitted to be performed on-site.

(It will be appreciated that restrictions on physical access to a machine are less likely to be breached in general than restrictions on software access over a network, not least because an intruder who is physically located at a computer system is much more exposed to being apprehended than someone who only accesses it remotely through cyberspace).

Consequently, there is a continuing need for on-site maintenance of computer installations. Although the majority of software service operations can typically be performed by customer staff themselves, who are often familiar with the software environment of the installation, this is not generally true for hardware maintenance. Rather, this is usually accomplished by visiting engineers who have the appropriate specialist skills in order to perform the necessary service action.

However, even although such service personnel are usually highly trained, the complexity of modern day computer systems is such that their task can be potentially daunting. Consider, for example, a comparison with car maintenance, where most repairs are performed at a specialist location equipped with advanced diagnostic equipment. In contrast, computer service engineers have to operate on-site at customer locations, and can therefore only be provided with relatively minimal, portable equipment for their visits.

Furthermore, in car maintenance, all the vehicles of a particular model are substantially uniform, and indeed there is a high degree of commonality in the basic design of a car that extends across most models (the presence and layout of the wheels, suspension, engine, and so on). However, there is no such homogeneity in computer installations, even sometimes from the same manufacturer. This is particularly true for larger scale server computing systems, which are often supplied on a bespoke basis.

Thus the components in any given computing installation are likely to vary according to the particular needs of any one customer, for example, in terms of number and type of storage units (tape, hard disk, optical, etc.), in terms of network connection (ISDN, local area network, T1/E1 telephone trunk lines, etc.), in terms of processing power, and so on. Moreover, even when the components of a system are in fact common between two different installations, their layout within and between various units of the installation can vary according to a wide range of circumstances, including the physical properties of the location (such as the shape of a room, the position of power points, windows, and surrounding offices), the nature and positioning of existing ancillary equipment (such as legacy systems, cooling facilities, etc.), the capacity and location of available external network connections, and so on.

A further complexity is that there can be multiple copies of the same unit within the computer system. Thus it is a common strategy in designing such systems to repeat units to obtain the desired capacity for the installation. This can be true at the component level (for example multiple disk storage units, multiple processor boards, etc.), and/or at the machine level, where multiple computers can be clustered together into an overall installation. In the latter case, the individual machines may or may not be identical across the installation, and may or may not have common components (manufacturers frequently re-use certain components, such as network cards, across a whole range of models).

It will also be appreciated that providing two or more copies of particular components and/or machines within an installation can be used not only to increase the overall capacity of the installation, but also to provide at least some degree of redundancy or fault tolerance against failure. An example of this is the Redundant Array of Inexpensive Drives (RAID) architecture used in storage facilities. Such a system has multiple components in concurrent operation, and is able to continue processing in the event of the failure of one (or possibly more than one) of these components, albeit normally by sacrificing capacity or redundancy. Alternatively, such fault tolerance may be achieved by having a backup system effectively in reserve. This backup system is then available to be brought on-line in the case of a fault, but is otherwise non-operational.

As a result of the above, the service engineer arriving at a customer location can be faced with a challenging task. Let us say, for example, that a particular unit has failed and needs to be replaced on-site. An example of such a field-replaceable unit (FRU) may be a disk drive, a network connection card, and so on. The engineer is now faced with the task of finding the relevant unit, despite the fact that there may be multiple identical such units present in the installation, and that the arrangement and layout of these various units may well be different from any installation that the engineer has previously dealt with. It can be seen therefore that even if the replacement of the FRU itself is quite a straightforward service operation, the engineer has to first locate the relevant unit within the installation, making sure that he/she has indeed found the correct unit, rather than an identical one that also happens to be present.

It will be appreciated that this search for the correct unit generally adds to the time required for the engineer to perform the desired service operation, and so decreases his/her overall productivity, in terms of the total number of tasks that can be accomplished in a given time. This in turn will translate into increased costs, whether these have to be met by the manufacturer (for example as warranty support), by the service provider, or by the customer (who it could be argued ultimately pays the cost anyway). This is a particularly sensitive issue, given that projected total cost of ownership, in other words the combination of both initial purchase and subsequent support costs, is becoming an increasingly important factor for customers when buying computer equipment. Furthermore, in an environment in which there are frequently shortages of skilled personnel, the reduced productivity caused by problems in having to locate a given FRU can lead to customers having to wait longer for repairs. Not surprisingly this can result in increased customer dissatisfaction.

Potentially an even more serious problem is that confusion as to the location and identity of any particularly FRU may lead the service engineer to make a mistake. One possibility for example is that the wrong unit is replaced—in other words, rather than replacing the malfunctioning unit, the engineer replaces an identical, but still operational, unit. Alternatively, an engineer may make a mistake as to the particular installation procedure and/or software configuration required, given the precise details of the customer installation (for example, certain hardware settings on a network card may need to be adjusted according to the particular physical environment, the type of network connection, signal strength, power supply, and so on). It will be appreciated that at best this can lead to wasted time and further expense, either by prolonging that service visit, or potentially necessitating a subsequent visit, while at worst there may be damage to the customer machine and/or data. In addition, there is almost certainly going to be a negative effect on customer confidence, and the system involved may develop an unwanted reputation for poor serviceability (even if the support is being provided by an organisation other than the original system vendor).

In summary therefore, it will be seen that the service arena is a very challenging one, but one that has a significant commercial impact in terms of performance, cost, and customer perception. Consequently, it is important to ensure that service offerings are as quick, reliable, and cost-effective as possible.

SUMMARY OF THE INVENTION

In accordance with one embodiment of the invention there is provided a method of performing a service operation on a computer at a customer location. The method begins with receiving at a support centre from the computer information indicative of the need for the service operation. Based on this received information, the service operation to be performed is identified, and a task record for the service operation is forwarded from the support centre to a mobile computing device associated with an engineer who is to perform the service operation. Prior to the engineer commencing the service operation on the computer at the customer location, a local communication link is established between the computer and the mobile computing device. Data transmitted over this link allows the engineer to confirm the particular service operation to be performed.

Such an approach typically implements a closed loop of communication from the computer, through the support centre and mobile computing device, and then back to the computer at the time of repair. This provides an efficient and consistent mechanism for controlling the service operation without relying upon human data input (which is potentially unreliable), thereby minimising the risk of confusion or error in relation to the service task. Note that the closed loop may also effectively originate at the support centre, whereby the support centre provides information to the mobile computing device and computer to be serviced. This information can then be automatically compared and verified at the time of the repair. It will be appreciated that this verification can be performed on the customer computer and/or the mobile computing device of the engineer.

Typically the service operation to be performed comprises replacement by the engineer of a particular component of the computer. In one embodiment, the support centre can therefore interact with a stock control system to confirm the availability of a replacement for the particular component. As a further precaution, the mobile computing device verifies the identity of a replacement component to be used by the engineer against information included in the task record. In order to reduce the risk of human error at this stage, this verification can be performed automatically, for example by scanning a bar code or reading an RF tag on the replacement component to ascertain its identity.

In one embodiment, the support centre also assigns the service operation to an engineer. If there are a number of possible engineers who could perform the operation, then the assignment may be made on the basis of one or more predetermined criteria, such as the skill level and training of the engineer, their previous experience with the particular service operation and/or the customer who owns the computer, the geographic coverage of the engineer, and so on. The service operation can then be scheduled in the diary of the assigned engineer (which will typically be maintained on his/her mobile computing device). It will be appreciated that the assignment and scheduling of the service operation may overlap, in that one of the predetermined criteria for allocating the service operation may be availability of the engineer.

(While the term "engineer" is used herein to denote personnel for performing service operations, this should not be taken as requiring any particular formal qualifications or organizational title. In various circumstances, such engineers may be termed technicians, service operatives, customer support personnel, and so on).

In one embodiment, the communications link established between the computer being serviced and the mobile computing device can be used for additional tasks beyond confirmation of the service operation to be performed. These additional tasks include verifying the authorisation of the engineer, and also providing the engineer with information to assist in the service operation. In the latter case, this information may for example represent a diagram illustrating the precise location of a component to be replaced within the computer, or the current status of operations connected with the repair (such as that a newly inserted replacement component has now been successfully configured by the computer).

Once the service operation has completed, a confirmation of this fact is typically sent back from the mobile computing device to the support centre. A similar confirmation may also be sent by the computer itself. This confirmation can be used to close off task records associated with the service operation, and also to trigger customer billing if appropriate. The confirmation may include some formal verification from the customer, such a signature onto an electronic form presented by the mobile computing device. (In this case the mobile computing device includes a penpad or similar function, in order to allow the customer signature to be digitised and processed).

In accordance with another embodiment, there is provided a method of running a support centre to control a service operation to be performed on a computer. The method begins with receiving information at the support centre from the computer indicative of the need for a service operation. Note that such receipt typically occurs over a wide area network (WAN) link between the customer and the support center, which may be implemented using the Internet or some form of extranet. Alternatively, the information may be telephoned in by personnel at the customer location.

A service operation to be performed is then identified based on this received information, and a task record for this service operation is sent from the support centre to a mobile computing device associated with an engineer who is to perform the service operation. Control information about the service operation to is also transmitted from the service centre to the computer. This can then be compared with the task record on the mobile computing device, in order to allow the computer to confirm that the correct service operation is to be performed by the engineer.

In accordance with another embodiment of the invention, there is provided a method of using a mobile computing device to support a service operation on a computer. The mobile computing device is associated with an engineer who is to perform the service operation. The method begins with receiving a task record for the service operation from a support centre over a first network. At least a portion of the task record can be matched with data available on the computer. Prior to the engineer commencing the service operation on the computer, a local or direct communication link is established between the computer and the mobile computing device. This is then used to match this portion of the task record against the data available on the computer in order to confirm the service operation to be performed. Once the service operation has been completed, a confirmation is sent back to the support centre over the first network.

It will be appreciated that the matching can be performed on the mobile computing device and/or the computer, by the appropriate transmission or exchange of data over the communication link. For example, if the computer to be serviced is to perform the matching, then the relevant portion of the task record is transferred from the mobile computing device over the communication link to the computer.

Typically the first network is a cellular telephone network, to allow the support centre to connect easily to the mobile device, while the communication link between the mobile computing device and the computer is implemented using a wireless infrared link. This link can be used by the computer to provide other information of assistance to the engineer using the mobile device, for example, a diagram guiding the engineer to a component to be replaced, or an update on certain operations being performed by the computer, such as deconfiguration of a component to be replaced. Note that it is generally more convenient for such information to be displayed on the mobile computing device than on a fixed terminal of the computer, since the former is portable around the computer installation. A further possibility is that some form of visual assistance could be provided to the engineer on the system to be repaired, for example a light could be illuminated in order to identify the relevant system.

In another embodiment of the invention, there is provided a method of controlling a service operation on a computer. This starts with forwarding a task record for the service operation from a support centre to a mobile computing device associated with an engineer who is to perform the service operation. In addition, information about the service operation is forwarded from the support centre to the computer. Prior to the engineer commencing the service operation on the computer, a local communication link is established between the computer and the mobile computing device. This allows data from the task record to be confirmed against the information received by the computer from the support centre, thereby helping to ensure that the correct repair operation is performed.

In accordance with a further embodiment of the invention, there is provided a support centre for controlling a service operation to be performed on a computer. The support centre includes a first network interface for connection to the computer, thereby allowing receipt of information indicative of the need for a service operation from the computer; a scheduler for generating a task record for the service operation to be performed in accordance with the information received from the computer; and a second network interface for connection to a mobile computing device associated with an engineer who is to perform the service operation. The task record is downloaded from the support centre onto the mobile computing device and control information about the service operation is transmitted over the first network interface to the computer for comparison with the task record on the mobile computing device. This then allows the computer to confirm that the correct service operation is to be performed by the engineer.

In accordance with a further embodiment of the invention, there is provided a mobile computing device to support a service operation on a computer. The mobile computing device is associated with an engineer who is to perform the service operation. The mobile computing device incorporates a cellular telephone interface to establish a connection to a support centre; a diary facility for storing a task record for the service operation, which is received from the support centre over the cellular telephone interface; and a communications interface for establishing a local or direct link with the computer to be serviced. This link is used to match the task record against data available on the computer, in order to confirm the service operation to be performed.

In accordance with other embodiments of the invention, computer program products are provided comprising machine readable program instructions that when loaded into the mobile computing device and machine(s) at the support centre (as appropriate) cause such systems to implement the methods described above. Note that the program instructions are typically supplied as a software product on a physical storage medium, such as a CD-ROM, or for download over a network, such as the Internet, or some form of cellular communications network. Whichever route is adopted, the software can then be loaded into machine memory for execution by an appropriate processor (or processors), and may also be stored on a local non-volatile storage facility, such as a hard disk drive.

In accordance with another embodiment of the invention, there is provided a method of operating a support centre for controlling a service operation to be performed on a computer. The method begins with storing records about outstanding service operations. The support centre has a cellular telephone interface for connection to a mobile computing device belonging to an engineer to perform the service operation, and a first network interface for connection to the computer to be serviced. A service task record corresponding to the service operation is transmitted over the cellular telephone interface to the mobile computing device, while information corresponding to at least part of the service task record is transmitted over the first network interface to the computer to be serviced. In due course, confirmation is received over the cellular telephone interface that the service operation has been successfully completed. This confirmation is conditional on the task record corresponding correctly to the information transmitted over the first network interface to the computer to be serviced. In response to receipt of this confirmation, the stored record corresponding to the service operation can now be closed.

In summary therefore, the approach disclosed herein concerns performing a service operation on a computer. In one embodiment, information indicative of the need for a service operation is sent by a customer computer to a support centre. Based on this received information, the support centre then identifies the service operation to be performed on the computer, such as the replacement of a faulty component. The support centre then creates a service task record describing this service operation, which is transmitted from the support centre to a mobile computing device associated with an engineer who is to complete the service operation. This typically includes schedule information, detailing when and where the service operation is to be performed. When the engineer then arrives at the customer location, a local communication link is established between the customer computer to be serviced and the mobile computing device, for example using an infrared link. Information transmitted over this link allows the mobile computing device and the customer computer to confirm with one another the details of the service operation to be performed, such as which particular component of the computer is to be replaced. This minimises the likelihood of mistakes being made during the service operation. Finally, a confirmation that the repair has been completed can be transmitted from the mobile computing device and/or the customer computer itself back to the support centre.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 1:
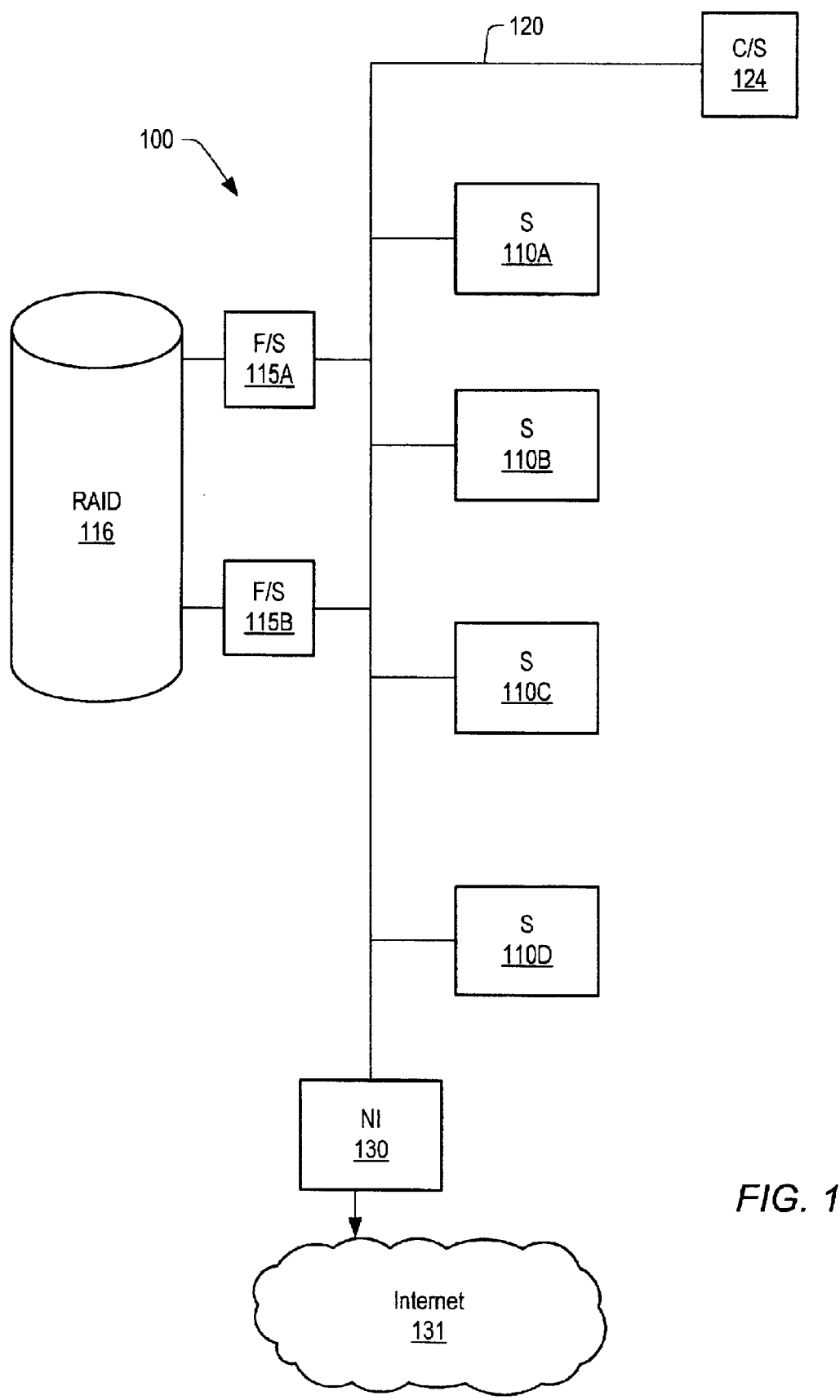
FIG. 1 is a schematic diagram of a typical computer installation.

FIG. 1 represents an illustrative computing installation 100. The installation includes four server units, 110A, 110B, 110C and 110D, which perform the main processing of the installation. The servers are connected to network 120, which may for example be an Ethernet, SCSI link, fibre channel link, and so on. Attached to network 120 are two file servers 115A,B, which in turn are linked to a redundant array of inexpensive drives (RAID) 116. Thus RAID system 116 provides disk storage for servers 110, which they access via file servers 115.

The network 120 is also linked to a contral station 124, which is typically a workstation or other computer. This is responsible for monitoring operations of the installation, such as traffic on network 120. In addition, when servers 110 or other units detect internal faults, they report them to control station 124 over network 120.

FIG. 1 also depicts a network interface unit 130 attached to network 120. The network interface unit 130 is linked to an external network 131 (such as the Internet), and so provides a communications gateway for servers 110 and control station 124 to communicate with geographically remote systems.

As previously mentioned, there is a very wide range of possibilities for a computer installation. Accordingly, the skilled man will be aware of many possible modifications to the system shown in FIG. 1 (which is purely by way of illustration only). For example, it may be desirable to replicate certain components, such as control station 124 and network interface 130, in order to provide redundancy against failure. In addition, network 120 may actually comprise multiple networks, each adapted to a specific task. For example, fibre channel links may be used for storage connectivity, an Ethernet for external communications, and a PCI bus for some service communications to control station 124.

In one embodiment, control station 124 and/or servers 110 support an infrared or similar wireless connection to an external device (not shown in FIG. 1). This can be utilised in service operations, as will be described in more detail below.

Figure 2:
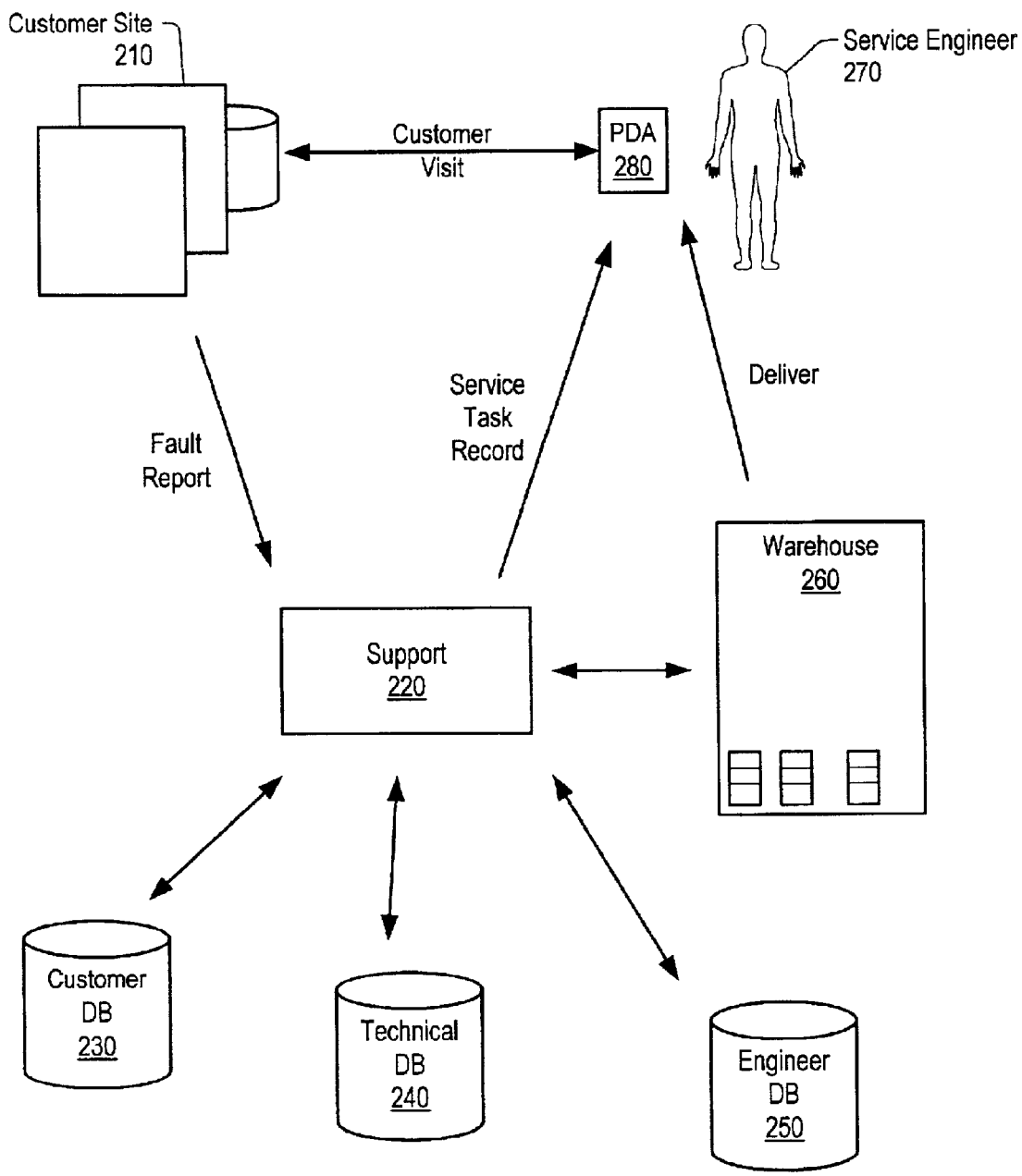
FIG. 2 is a schematic diagram of the various entities involved in providing service in accordance with one embodiment of the present invention.

FIG. 2 illustrates schematically the various components involved in a support process according to one embodiment of the invention. This diagram depicts a customer location 210, where the fault originates, and a support centre 220, which coordinates the service procedure. The support centre typically includes one or more computer systems that run programs to implement the tasks described below. Such systems can be based on any appropriate type of machine, such a server system from Sun Microsystems Inc running the Solaris operating environment, a network of personal computers, and so on (Solaris is a trademark of Sun Microsystems Inc.). Since these are well-known in the art, they will not be described further. Note that the computer installation shown in FIG. 1 represents an example of a system that could be utilised by the customer and/or the support centre.

Figure 3:
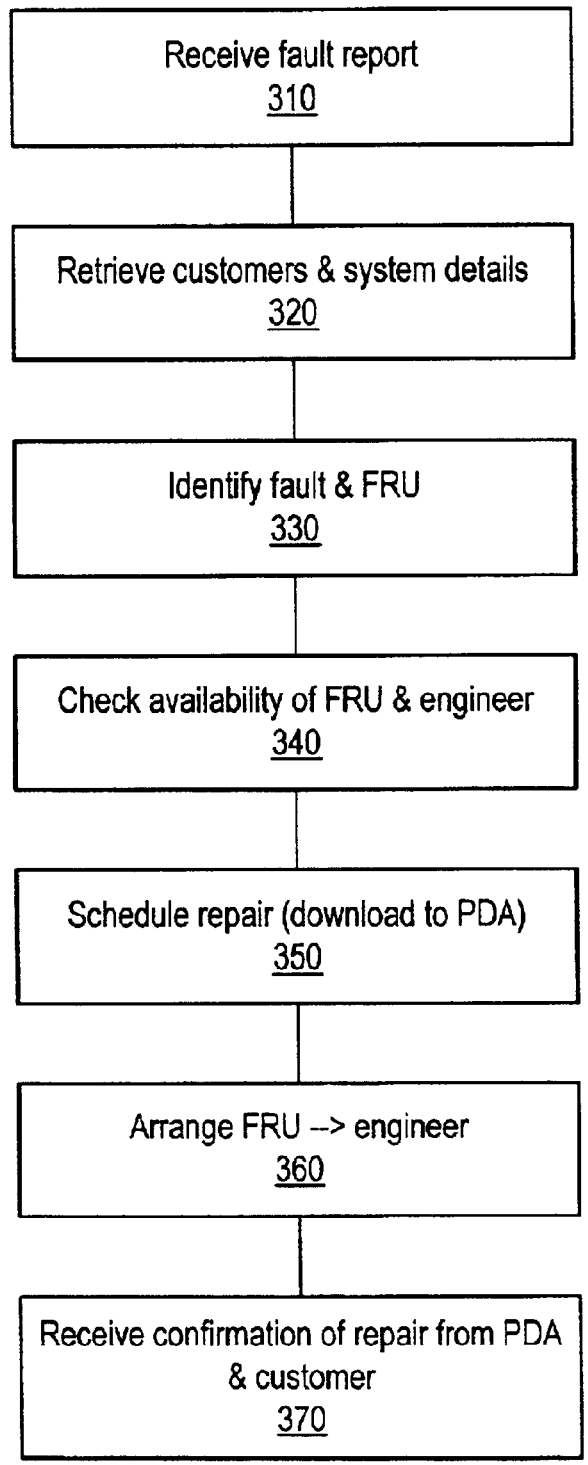
FIG. 3 is a flowchart illustrating the operations performed by the support centre of FIG. 2 in a service operation.

FIG. 3 provides a flowchart of the various operations performed at the support centre. Note that the support centre may be run by a hardware manufacturer in order to perform warranty support and/or other service operations, or it may be provided by an independent service organisation. Another possibility is that the support centre belongs to the same organisation as the customer location 210, and serves to provide a centralised support facility for a range of customer locations.

The procedure of FIG. 2 begins with the receipt at the support centre (220) of a fault report from the customer location 210. Although certain aspects of the fault report may be entered manually by the customer, it is helpful for as much of the information as possible to be generated automatically by the diagnostic facilities of the customer computing installation. This then minimises the possibility of any data input errors. One way of achieving this is to provide the installation with some form of service architecture for collecting and collating diagnostic information.

The report can then be transmitted, for example as an email message, over the Internet, a special-purpose support extranet, or any other appropriate data communications link or wide area network (WAN) provided between the support centre 220 and the customer location 210. Alternatively, the fault report may be passed to the support centre by a telephone caller. (Although telephone reporting is more error prone due to the human intervention, it can be attractive to customers who, for security reasons, want minimal contact between their computer system(s) and any external network).

The incoming fault report is typically assigned some identifier either by the customer or by the support centre, which can then be used for further tracking purposes. Thus the support centre 220 stores records (not shown in FIG. 2) of pending faults on customer system 210 and at other customer locations, in order to allow progress towards resolution of the faults to be monitored.

The details of the information included in the fault report are discussed below, and will vary according to circumstances. Nevertheless, it will be appreciated that this information may not be provided all upfront in a single fault report. Rather there may be a succession of messages resulting, for example, as the support centre interrogates the customer location in order to obtain particular details about system performance, the customer configuration, and so on. Other information useful for subsequent portions of the service task may also be obtained in this manner, such as suitable timings for performing system maintenance (depending on the availability of local personnel, scheduled system tasks, etc). It will also be appreciated that the customer site 210 may not transmit a fault report per se, but rather a succession of ongoing diagnostic and performance information. It is then the task of the support centre to analyse this received information, to determine whether the customer system is operating correctly, or whether a fault is present that must be resolved.

Once the existence of a fault has been detected (step 310 of FIG. 3), either through the receipt of a fault report or some other mechanism, the support system now needs to collect the information needed to make a proper diagnosis of the fault (step 320). As shown in FIG. 2, in one embodiment the support centre has access to two databases to assist with this task, namely a customer database 230 and a technical database 240. The former, as its name suggests, holds information about various customers of the support centre 220, while the technical database 240 provides details for use in fault diagnosis for a range of models (which may potentially originate from different vendors). For example, the technical database 240 may include a listing of known faults, together with suitable workarounds (if any). The technical database 240 may also include information obtained by the support provider based on its own experience with various systems in the field.

It will be appreciated that these databases (plus any others utilised by the support centre) may be stored locally at the support centre, or may be accessible from one or more remote locations over any suitable communications link, such as the Internet. The databases do not all have to be stationed at the same physical location, and moreover each database may comprises multiple separate databases. For example, the customer database 230 may store generic information about the customer (such as address, invoicing information, etc.) separately from particular details of the customer computer installation. Likewise, the technical database 240 may have multiple components; for example each vendor could provide a database having service information for its own systems, and these can then all be accessed by the support centre 220.

The support centre utilises customer database 230 and technical database 240 to determine details about the particular system and configuration at the customer site. Note that some customers will have more than one computer installation (potentially at different geographical sites), and it is therefore important for the support centre 220 to be able to identify the particular customer computer system that originated the fault report. Such details may be included in the initial fault report, or may be stored in the customer database 230; a further possibility is for the support centre to obtain the desired information by an exchange of messages with the customer site 210. A range of ancillary customer information can typically also be obtained from the customer database 230 and/or the customer location 210. This may include a customer contact name, and details of the customer support policy (e.g., whether on a 24 hour response time, a 48 hour response time and so on).

Figure 4:
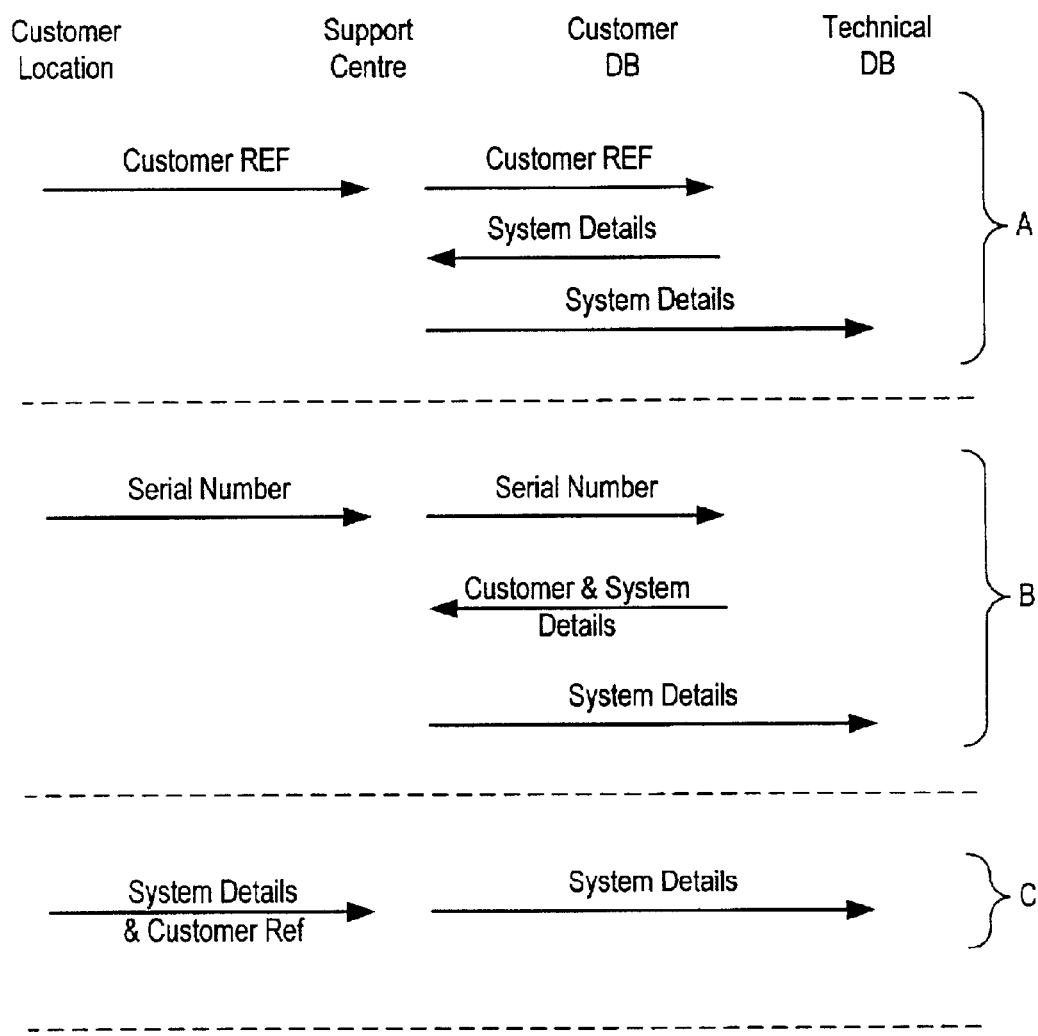
FIG. 4 provides various examples of the information flow between entities in the initial handling of a fault during the service operation.

FIG. 4 illustrates three example message exchanges, denoted A, B, and C, whereby the support centre can obtain the relevant system information in order to perform a fault diagnosis. In message exchange A, the support system receives a customer reference with the fault report (which may be implicit, such as the telephone number from which the on-line fault report was received). The customer database is then accessed using this customer reference to retrieve stored details about the customer's system (configuration, model types, etc.). Note that this may include previous service information concerning the customer that may assist with a fault diagnosis (such as that a particular component is already suspected of malfunctioning). The customer details can then be passed to the technical database in order to extract information relevant to diagnosing the particular fault being experienced.

In message exchange B, the support system receives a machine serial number from the customer location. The customer database is then accessed using this serial number to determine both the customer involved and also details concerning the system having such a serial number. These can then be passed to the technical database in order to access the desired diagnostic information. Note that in this exchange, the initial fault report may also include a customer reference, which can then be verified against the customer reference retrieved from the customer database.

In message exchange C the relevant system details such as configuration and model type are obtained directly from the customer location (whether in the initial fault report, or via subsequent interrogation). These details are then sufficient to directly access diagnostic information in the technical database.

Figure 5:
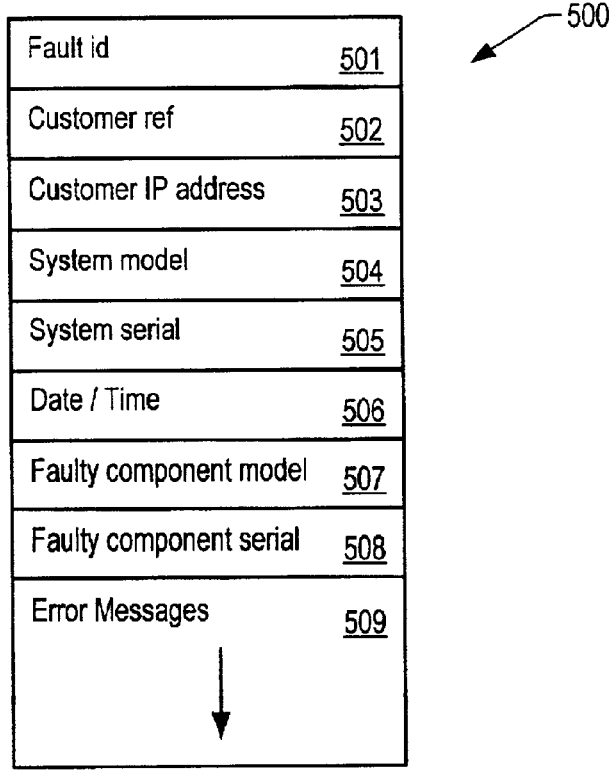
FIG. 5 is an example of a fault report as transmitted in the embodiment of FIG. 2.

FIG. 5 illustrates one example of a fault report as transmitted from the customer location 210 to the support centre. This record includes: a fault identifier 501, which is used for subsequently tracking operations related to the fault; a customer reference 502, which is used by the support centre to identify the customer in the customer database 230; and a customer Internet Protocol (IP) address. The fault report also includes the system model 504 involved, the serial number 505 of the system; the date/time 506 at which the fault report was generated; the model 507 and serial number 508 for the component identified to be faulty (if known), plus a listing of error messages indicating the presence of the fault.

Note that the fault id should be unique to the customer, or at least to the customer system (as per the machine serial number). One possible combination therefore is that the combination of fields 501, 502 and 505 are used provide a unique identifier within the support centre 220.

It will be appreciated that both the message exchanges of FIG. 4 plus the fault report of FIG. 5 are by way of illustration only, and the skilled person will be aware of many further possibilities and modifications of the message exchanges/fault report as depicted respectively in these two Figures.

In addition, although the messages of FIGS. 4 and 5 are described herein as fault reports, they do not necessarily indicate the presence of a fault per se. Rather, such a report may simply indicate that a particular service operation is now due. For example, it may indicate that a particular component needs replacing as a standard precautionary measure, either because a certain date has passed, or because a certain number of operations have been performed (e.g., a moving part on a printer is due for replacement after say 100,000 copies have been output). Another possibility is that the report indicates that a certain expendable component (such as printer toner) is running low and should be replaced, or that the capacity of certain aspects of the system is nearly fully utilised, and an upgrade should be provided (for example, adding extra communications cards if the network interface capacity is almost exhausted). A further possibility is that the report is simply used by the customer to order an upgraded component, such as a more powerful processing unit. It will be appreciated that in all these circumstances the system is still operating properly for the present at least, but nevertheless it is desirable for some form of service or support task to be performed on the system.

Returning now to FIG. 3, the next task is to identify the nature of the fault at the customer site 210, and also the appropriate remedy (step 330). There are a range of potential mechanisms for performing this identification, depending on the nature of the fault and other circumstances. Thus one possibility is that the systems on the customer site 210 can automatically identify the fault, thereby obviating the need for any reference to technical database 240. In this situation, the fault report may specify that a particular component is malfunctioning, and identify a particular type of field replacement unit (FRU) to be utilised.

On the other hand, the support centre itself may be responsible for performing at least some of this work. For example, if the fault report simply identifies that a particular component is not operating properly, the support centre then has to determine the relevant FRU that contains this component, in order to allow the repair to be made. Typically this identification will involve technical information stored at database (240). A further possibility is that the symptoms contained in the fault report match a known malfunction as detailed in the technical database, and accordingly an appropriate fix can be identified automatically.

In many situations, the fault report may be less conclusive. For example, it may simply incorporate a string of error messages from various components without permitting an immediate identification of which one of the components is actually faulty. (It is common for an error at one location in a computer system to produce further errors at additional locations that would otherwise be functioning correctly, were it not for the presence of the fault at the original location). Accordingly, the diagnosis may require the intervention of a human engineer, who may if desired retrieve information from the technical database 240. It may also be appropriate for the support centre 220 to request the customer location to run various diagnostic tests and to report the results reported back to support centre 220, to allow the source of the error to be pinpointed.

We will assume in this particular case that it is determined that the fault must be rectified by using a FRU, whereby a particular hardware component at the customer location has to be replaced or upgraded on site. In order to schedule this repair, the system must then check the availability of the two entities involved, namely the FRU itself, and also a service engineer to perform the replacement (step 340).

Considering the FRU first, it is assumed that this is stored as inventory in a warehouse 260. This can be confirmed by the support centre 220 interrogating the (computerised) stock control system for warehouse 260, in order to confirm the availability of the FRU (step 340). Providing the desired part is indeed in stock, it can now be reserved for the customer.

On the other hand, if the relevant FRU is not currently present in the warehouse, then an appropriate ordering mechanism can now be triggered. This may involve analysing the holdings of other warehouses run by the same support organisation to see if these do stock the relevant component, the transmission of a request for the component to the original manufacturer, and/or an attempt to obtain the component from a distributor or other intermediary, potentially through an on-line business to business (B2B) exchange. Note that these operations to locate a FRU may be performed by the support centre 220 itself, by the warehouse 260, or by some other organisation on behalf of the support centre (such as a procurement group). The end result of this procedure is assumed to be that the relevant FRU is available from a particular date, which may be sooner or later depending on how it is being sourced.

Step 340 also includes identifying a suitable engineer or technician to perform the service task (it will be appreciated that this can be performed before, after, or in parallel with locating the relevant FRU). In one embodiment, this is performed by interaction with an engineer database 250 that lists service personnel, and also gives details of the type of operation that they have been trained to perform (in other words whether they are competent to perform this particular FRU operation). Such information may be stored very generally, for example as a simple indication of the relative skill and experience of the person (whether they are a junior engineer, a senior engineer, and so on). Alternatively, the stored information may be much more specific (e.g. whether a person has completed a particular training course deemed necessary for making a given repair). A further possibility is that the engineers are categorised according to the types of systems that they work on, thereby allowing an engineer to be allocated on the basis of the model of computer involved.

Note that it is desirable for relatively straightforward tasks to be assigned to comparatively junior engineers, thereby reserving the more advanced engineers for complex repair tasks that only they can perform. It is also desirable to assign engineers to tasks that match their own particular experience, such as whether or not they have already (successfully) replaced this FRU for other customers, and can therefore be expected to be able to complete the desired repair quickly and competently. Again the necessary information for making such assessments can be stored in the engineer database 250.

An additional criterion for assigning an engineer to a particular repair task is whether he/she is particularly associated with the customer who owns the installation 210. Thus an engineer may already be specifically assigned to the customer, either directly or indirectly (for example, because the engineer is assigned to the market sector in which the customer belongs, and/or to the geographical area in which customer site 210 is located). A further important factor is whether or not the engineer has previously performed support tasks for that customer, so that continuity of service is experienced. It will be appreciated that some information regarding these factors may be stored in the customer database 230, instead of or as well as engineer database 250.

The selection of a suitable engineer to perform the service task must also allow for their schedule, for example, to what extent they are already occupied with previously arranged customer visits, when they are unavailable through vacation, and so on. This information may only be available from some form of mobile computing device allocated to an engineer 270, such as a personal digital assistant (PDA), notepad, palmtop, laptop, or other such device. In this particular embodiment, it is assumed that engineer 270 has a PDA 280, on which diary information for the engineer is stored. This diary information may also be stored on the engineer database 250 (for example, if this is synchronised with the PDAs of the various engineers). However, if this is not the case, the support centre needs to interact with the PDAs of those engineers who could potentially perform the desired repair, in order to investigate and then confirm the scheduling information. (Further details concerning the PDA 280, including its communication with the support centre 220, are discussed below).

Once the support centre has access to the desired availability information of the FRU(s) and the potential engineer (s), then the necessary repair can be scheduled at the customer location (step 350). It will be appreciated this scheduling typically involves consideration and reconciliation of multiple parameters in order to optimise the use of resources. For example, the quickest response should be given to high value customers, or customers who have priority service contracts (typically as identified in the customer database 230). It is also desirable to try to minimise the amount of travelling that an engineer has to perform from site to site, thereby maximising his/her productive time spent at customer locations.

Note that the scheduling of the repair and the determining the availability of an engineer and/or FRU may be interdependent, and so are perhaps best regarded as all part of the same operation. For example, a given FRU may be replaceable by two different components, one slightly cheaper but not currently in stock at warehouse 260, and the other slightly more expensive but available. In this situation, it may be necessary and indeed potentially more cost-effective to utilise the more expensive FRU in order to perform the repair quickly (for example if a service engineer visit is already scheduled for the customer location in the near future, before the cheaper FRU can be obtained). Similarly, schedule information may simply represent another factor in the selection of service engineer. This can lead to a trade-off between likely speed of repair (based on availability of an engineer) and various other factors, such as whether the engineer is already familiar to the customer.

An additional factor is that the scheduling may need to take into consideration certain customer requirements (not shown in FIG. 3), such as the availability of a particular contact at the customer site, and/or particular operational issues, for example a business need for the customer installation to be fully functional at the end of the month (which may provide a reason either to complete or to defer the repair by/until a certain date).

Overall, it will be appreciated that the complexity of the scheduling operation will vary according to the number of engineers available to support centre 220, and the degree of optimisation attempted. If there is only one engineer, and each service task is scheduled on an individual basis as it is identified, then scheduling should be comparatively straightforward. On the other hand, if there are multiple engineers, and/or an attempt is made to schedule multiple service tasks simultaneously (both of which could help to optimise the use of resources by providing greater scheduling flexibility), then the complexity can increase significantly. Note however that various software packages are available to help perform this sort of scheduling automatically.

Assuming that it is indeed possible to determine a date and time for the repair that is suitable for the customer and the selected service engineer, and for which the FRU itself is available, then the support centre proceeds to schedule formally the service operation (step 350). Typically this involves sending appropriate instructions to the PDA 280 of the relevant service engineer, plus notification to the customer site 210 and the warehouse 260. Note that at this juncture, the support centre may download all relevant information about the service operation to the PDA, or, particularly if there are space restrictions on the PDA, it may limit this initial download to general information, such as place, time and date of the appointment, plus a general description of the service task. Further details and/or instructions, such as the original fault report, can then follow nearer the date of the actual visit. (It will be appreciated that the fault tracking identifier itself is generally always used when scheduling the repair, and indeed for all other communications relating to the service task).

Figure 6:
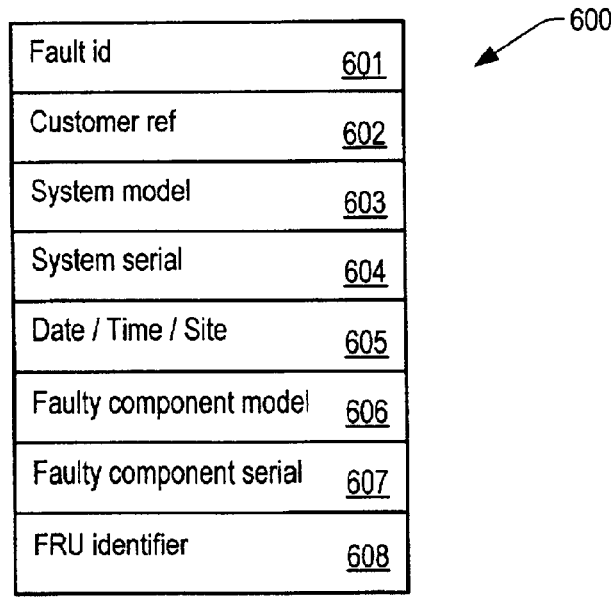
FIG. 6 is an example of a service task record as transmitted in the embodiment of FIG. 2.

An example of a service task record 600 as downloaded to the PDA of a service engineer is illustrated in FIG. 6. Note that many of the fields in this record are derived from corresponding fields in the original fault report (see FIG. 5). In particular, this is true of the fault id field 601, the customer reference 602, the system model 603 and system serial 604 numbers, and finally the faulty component model 606 and the faulty component serial 607 numbers. Also included in the service task record is a field 605 specifying the date, time and location of the repair, plus an identifier of the relevant FRU 608 to be utilised. Note that such a task record can typically be integrated into the calendar system on the PDA 280.

A copy of the service task record can also be sent by the support centre 220 to the customer site 210. In these circumstances, it is appropriate to remove details from this customer copy that are not necessary or suitable for the customer, such as information relating to pick-up of the FRU at the warehouse 260, as described below (not shown in FIG. 6).

It will be appreciated that the service task record shown in FIG. 6 is an example only, and the skilled person will be aware of many variations on this, including additional pieces of information, and potentially omitting others.

The next step in the flowchart of FIG. 3 is to arrange for the FRU to be provided to the engineer in order to accommodate the scheduled repair (step 360). This task can be the responsibility of support centre 220 itself, or of the warehouse 260 or the PDA 280, once they have received confirmation that the appointment has been scheduled. One possibility for handling the FRU is to instruct the warehouse to mail or ship the FRU directly to the customer site, so that it is waiting on-site when the engineer arrives. The outcome here however depends on the reliability of the customer (whether they are likely to lose or mislay the FRU). Alternatively the warehouse may dispatch the FRU to the engineer, possibly for pick-up at a suitable collection point, such as a service centre. A further possibility is that the warehouse may simply retain the FRU for collection by the service engineer. It will be appreciated that in such circumstances it may be advisable for this pickup operation to also be scheduled on the engineer's PDA, in addition to the repair itself at the customer site.

It is also desirable for the service process to be able to support those occasions, mentioned above, where the FRU is being supplied to the engineer not from the warehouse 260, but rather from elsewhere, such as a distributor. In such circumstances, and indeed in any others where the FRU transits from one location to another, it is useful for the support centre to be able to automatically track the FRU. This allows the service centre to know the current whereabouts of the FRU at any given time, and so to be able to inform the service engineer and/or customer accordingly.

Note that when the service engineer does eventually receive the FRU by whatever route, he/she should confirm that it matches the FRU specified in the service task record (see field 608 in FIG. 6). In one embodiment, the PDA is provided with a bar code scanner in order to automate this process. Thus a bar code on the received FRU is scanned, and the result compared automatically to data in the service task record.

Figure 7:
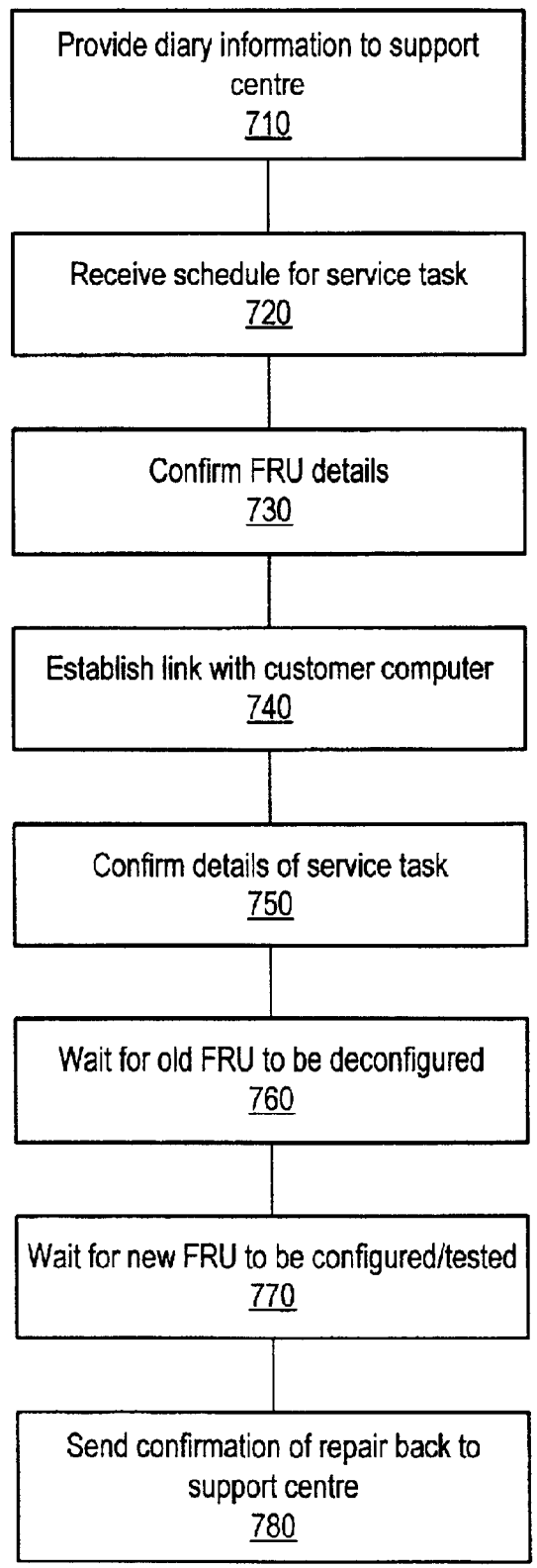
FIG. 7 is a flowchart illustrating the operations performed by the personal digital assistant (PDA) of the service engineer of FIG. 2 in respect of the service visit, in accordance with one embodiment of the invention.

FIG. 7 illustrates the operations performed for the service operation from the perspective of the PDA 280 (N.B. the first three of the steps in FIG. 7 overlap with the processing already described). The flowchart starts at step 710 with the PDA providing diary information for the engineer to the support centre 220 (and/or the engineer database 250). Note that this can be done on an ongoing basis, such as a regular hourly synchronisation scheme between the PDA (client) and the support centre (server), or as a result of a specific enquiry from the support centre concerning the particular repair to be scheduled.

The method now proceeds to step 720, where appropriate details about the service task are downloaded from the support centre to the PDA (potentially via the engineer database 250). These will typically incorporate details of a particular FRU to be utilised for the repair task, possibly including information about how the FRU should be obtained. (Although it is assumed here for the sake of simplicity that there is only one FRU involved in the service task, it will be appreciated that there may in fact be multiple FRUs required).

Upon receipt of the desired FRU, from a warehouse, service depot or wherever, the PDA confirms that the correct part has indeed been obtained (step 730). As previously mentioned, this can typically be performed by scanning a bar code on the FRU to ensure that it matches data specified in the service task record received at step 720.

It is now assumed that the engineer arrives at the customer location. This can be facilitated by directions or map information available on the PDA, which may be provided with the service task record, downloaded from a customer web site, and so on. A communications link is now established between the PDA and the customer computer system (step 740). This is a local communications link in the sense that the data flow directly between the PDA and the customer computer installation (rather than being routed through a geographically remote intermediary, such as some computing facility at the support centre). In one embodiment the communications link is provided by a wireless connection, such as one defined by the Infrared Data Association (IrDA).

Note that if the customer installation comprises a cluster of multiple machines, or some other complex processing configuration, then this link may potentially be established with a machine other than the one that is to undergo the service operation, providing appropriate information can still be supplied to the PDA. (Indeed this may perhaps be desirable or necessary if the machine to be serviced has a particularly serious malfunction).

One problem that may arise if there are multiple customer machines is that they all try to respond to the PDA. It will be appreciated that this problem is likely to be particularly acute if the various machines are located physically close to one another and a wireless link such as IrDA is utilised. This difficulty can be addressed by identifying a particular customer machine when setting up the link, by using a machine serial number, or some other appropriate form of identifier, such as from the fault record. Thus the PDA can broadcast a message including the identifier which is received by potentially all the systems in the customer installation (or at least all those in the immediate vicinity). A customer machine only responds to the PDA to set up the link if the customer machine properly recognises the identifier. For example, if the machine has a serial number matching that in the broadcast message, then the machine initiates communications with the PDA. In contrast, the other (non-matching) machines simply discard the broadcast message.

Once a communications link has been established between the customer computer and the PDA, it allows the customer computer to confirm that the service operation to be performed is correct, by verifying information on the PDA (step 750). For example, the customer computer can check that the service task record (see FIG. 6) properly corresponds to information included in the fault report (see FIG. 5) as initially generated from the customer site 210, such as by confirming that they have the same customer reference number and serial number of the system to be repaired. The service task record in the PDA can also (or alternatively) be checked against information received by the customer computer from the support centre 220, such as a copy of the service task record, or at least certain information taken from it. This can be used, amongst other things, to ensure that the FRU identified at step 730 properly matches that required for the repair. Note that it may be advisable to (re)scan the bar code at the customer location, in order to ensure that there has not been any mix-up since collection.

In addition, the customer computer may perform some form of authorisation check on the service task record, to ensure that it has not been tampered with or corrupted. This can be achieved by applying a digital signature to the original service task record from the support centre 220, in accordance with known protocols.

The skilled person will also be aware of various other security precautions that could be adopted. For example, the support centre could notify the customer site 210 of the particular PDA 280 to which the service operation has been assigned (such as its machine serial number, etc.). This would then prevent unauthorised access to the customer computer centre, even if the service task record is intercepted and copied onto a separate device.

As a result of the above checking it can be confirmed that the correct engineer is at the correct location, and is about to perform a particular repair. Note that it may be particularly desirable for such checking to be completed if there are currently multiple repairs outstanding on the customer system, in order to avoid confusion as to which task the engineer is about to undertake.

Although in the embodiment illustrated in FIG. 7, the checking and any authorisation is performed by the customer computer 210, it will be appreciated that analogous checking could be performed alternatively or additionally within the PDA 280 itself. In order to implement this, the PDA receives information over the communications link established with the computer at step 740. The received information can then be matched against the task record and the FRU details (if available). As before, this can then be used to confirm, for example, that the engineer is at the correct location, and the correct computer is about to be serviced with the correct part. Note that performing this checking on the PDA has the advantage that as a piece of support equipment, it can be provided with the relevant software to (reliably) run the desired confirmation/authorisation process. In contrast, such software may not be available, or at least not functioning properly, on the customer computer.

There may also be certain other mechnanisms provided to help an engineer to confirm the service task to be performed. For example, the customer computer system may have a bar code. This can then be scanned by PDA 280, to confirm that information encoded in the bar code (such as model or serial number) correctly matches against the task record.

The engineer can now proceed with the service task itself, which it is assumed involves replacement of a particular FRU. During this task, the PDA can effectively serve as an input/output device for the customer computer. The benefit of this (compared to using some fixed terminal already present at the customer computer) is that the engineer can easily take the PDA with him/her, to whichever bit of the system requires the service operation. (To facilitate this, the customer installation may have multiple communications points for supporting the link to the engineer).

The PDA can also be used to provide the engineer with information to assist in the service operation. This information can be supplied either from the customer computer 210 (directly or indirectly), or from support centre 220. As an example, the PDA can provide details of the location of the relevant FRU within the customer configuration, such as by a map or diagram, and/or particular instructions (e.g. "The FRU to be replaced is one of a rack of 5 storage units, and is the second from the left"). It may also be possible to display the engineer's location on the PDA superimposed on the map of the customer's installation, to assist in rapid location of the service point.

A further strategy is for the computer to be serviced to itself provide some visual indication of this fact, such as having a light illuminate (typically in response to the contact from the PDA). This approach is particularly valuable in a large server environment containing many systems of otherwise generally similar appearance, since it helps again to ensure that the engineer does indeed service the correct unit.

Once the engineer has identified the FRU to be replaced (which may potentially be confirmed by scanning a bar code on the currently installed component) the engineer instructs the customer computer 210 through the PDA to deconfigure the unit to be removed. The engineer then waits until a message is received on the PDA, back from the customer computer, that this deconfiguration has completed (step 760), whereupon the engineer can perform the specified FRU replacement. Note that during this operation, the engineer can be provided on the PDA with technical guidance about the task in hand, for example, how to loosen a particular component, the appropriate physical settings for the new unit, and so on. In addition, if multiple FRUs are to be replaced on this one visit, the engineer can use bar code scanning to confirm the correct FRU to be installed at this particular location.

After the new FRU has been inserted into the customer computer, the engineer waits for the new components to be configured and tested (step 770). Note that such operations may be initiated automatically by the customer computer on recognising the presence of the new unit, or may be triggered by an appropriate command sent from the PDA when the engineer has physically completed the installation of the FRU. The customer computer then duly notifies the PDA that the configuration and/or testing has finished, and flags any problems that have been located (thereby giving the engineer an opportunity to resolve them while still on-site). Assuming however that there are no such problems, the service operation has now been successfully accomplished, and accordingly, an appropriate notification can be sent back from the PDA to the support centre (step 780). (A similar confirmation can also be sent by the customer computer itself).

Note that various measure can be adopted to formalise completion of the repair operation. For example, the customer may be requested to enter a completion code into the PDA, or to sign the PDA with an electronic pen. In the latter case, the digital image of the signature would then be stored in the PDA and/or transmitted back to the support centre computer.

The receipt of this confirmation by the support centre is shown as step 370 in FIG. 3, and can be used to trigger closing the fault record for the customer. Details of the fault report and resolution can be variously added to the customer database 230, the technical database, and to the engineer database 250 (to the extent not already present). These are useful to allow a range of statistics to be calculated for the support organisation, including engineer performance, customer service measures (response times, etc.), and reliability and maintenance requirements of various system models and components. In addition, receipt of the confirmation that the service operation has been completed can be used to initiate billing of the customer (if appropriate).

The engineer may also enter into the PDA technical information or notes that will potentially be useful for subsequent service operations, either for this customer or for other customers with similar systems. For example, such information may include a note about the particular configuration at the customer, or how to physically open a particular unit. These details may be retained solely on the PDA, for future use by that engineer, and/or transmitted back to one or more databases at the support centre, where they can be shared with other engineers if desired.

Figure 9:
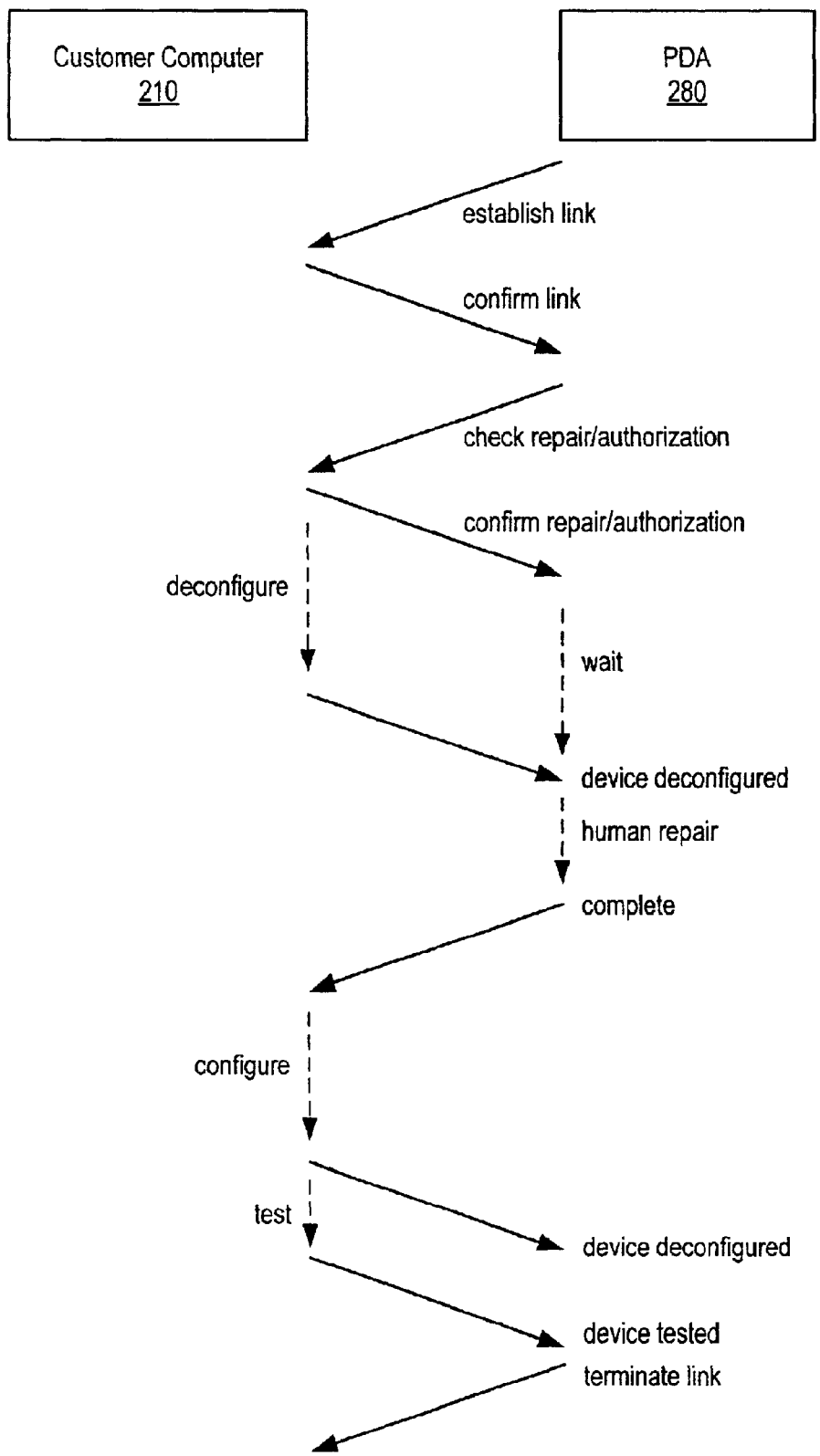
FIG. 9 is a schematic diagram of message exchanges between the PDA and the customer computer in accordance with one embodiment of the invention.

FIG. 9 is a schematic representation of communications between the PDA 280 and the customer computer 210 in one embodiment of the invention, corresponding to the latter half of the processing shown in FIG. 7. Note that each arrow in FIG. 9 depicts a single message, although in practice any given communication may be broken down into a sequence of multiple messages (and responses).

As previously described, the communications start when the PDA arrives at the customer site, and establishes a link with the customer computer. It then receives back confirmation of this link. Next, the PDA transmits authorisation details and other information about the planned repair to the customer computer, which verifies them and sends back confirmation that the repair should proceed. Such verification can also be performed on the PDA itself (as well as or instead of on the customer computer). Indeed, in some respects this is more appropriate, since the PDA can be regarded as a dedicated service device, and can be more readily programmed to perform such an operation.

The next task is to deconfigure the FRU. This may occur automatically following confirmation of the relevant service task, or it may be subject to a particular request from the engineer. In other words, in the latter case, after the verification process is complete, the customer computer waits until specifically requested by the engineer to deconfigure the relevant FRU. When this deconfiguration has been completed by the customer computer, it notifies the PDA accordingly. At this point the human engineer can perform the physical replacement of the FRU.

Once the engineer has finished this task, he/she makes an appropriate entry into the PDA. This causes an appropriate message to be forwarded from the PDA to the customer computer, allowing the latter to commence configuration of the new FRU, followed by testing. (It may be that such configuration only commences upon the specific request of the engineer). The customer computer notifies the PDA of the progress of these operations, so that the engineer can see when the service task (including testing) has been completed. At this point, it is time for the engineer to depart to another location, so the link between the PDA and the customer computer is broken. Note that at this point the PDA can also send a confirmation of the repair back to the support centre (as described above in relation to step 780 of FIG. 7).

It will be appreciated that the support mechanisms described above help to reduce the time required for a given service operation, and more especially to ensure that the service operation is performed competently and reliably. For example, information about the initial fault and the subsequent repair task is transferred electronically from the customer computer to the support centre, from there to the PDA, and from there back to the customer computer for confirmation purposes. This represents a closed loop of communications governing the whole repair procedure, and so ensures consistent operations throughout.

In addition, by avoiding the need for human data entry within this closed loop, the possibility of a transcription error is eliminated. (Note that by scanning the identity of the FRU, the selection of the replacement unit is also brought within this automated procedure). In addition, integrating certain procedural steps into the operation of the PDA further reduces the risk of human error, and also helps to enforce best practice. For example, the service engineer can in effect be compelled to remain at the customer location until the computer under repair completes its testing of the newly installed FRU, since it is only at this point that the confirmation is generated and passed to the PDA to signal completion of the service operation. (It is important from a customer satisfaction perspective that the engineer remains present until the repair is seen to be effective).

Figure 8:
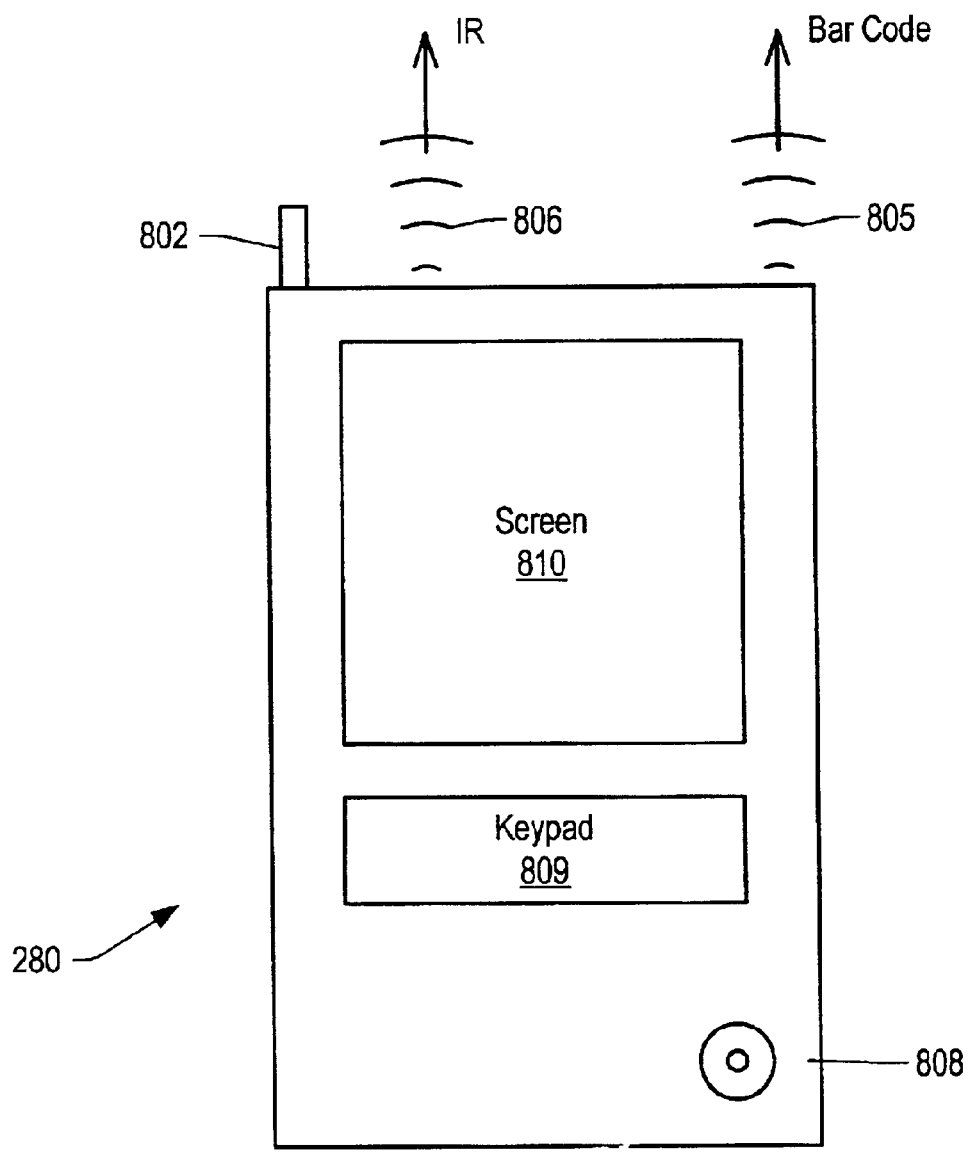
FIG. 8 is a schematic diagram of the PDA of the service engineer.

FIG. 8 is a schematic diagram of a typical PDA 280 for use by a service engineer in accordance with one embodiment of the invention. As previously described, the PDA serves a variety of roles in the repair process, including an electronic diary/calendar and notebook for an engineer, a client device for retrieving information to assist with the repair from the support centre, and a readily portable front end or interface device for communicating with the customer computer. It will be appreciated that in order to fulfill these roles, the PDA generally needs to be both lightweight and rugged.

As shown in FIG. 8, the PDA 280 includes an aerial 802 and internal components (not shown) that allow it to make and receive calls over a cellular (mobile) network. In particular, this provides a mechanism for the PDA to exchange information remotely with the support centre 220.

In order to support this data transfer, PDA 280 includes one or more of the data communication protocols common over cellular networks, such as Wireless Application Protocol (WAP).

Note that it is advantageous if this data transfer can be initiated by both the PDA 280 itself, and also by an external system, such as the support centre 220 (in other words, the PDA is not restricted to operating only as a pure client). This will then allow the support centre 220 (for example) to spontaneously interrogate the PDA 280 concerning locally stored information such as calendar details, and then to download the service tasks as they are scheduled. If, on the other hand, the PDA is indeed limited by its communication protocol to simple client exchanges which it must initiate itself, then this can be accommodated, providing the PDA arranges to contact the server (i.e. the support centre) on a regular basis, in order to promptly obtain updated information from the server.

PDA 280 further includes a keypad 809 and a screen 810, again as standard on most mobile phones. Note that the screen may potentially be touch sensitive to provide an additional data input mechanism, and in one embodiment can display both text and graphics of reasonable quality (for example to display a map showing the customer location, or the position of a particular FRU within the system to be serviced). The keypad 809 may just provide for numerical input, or for alphabetical input as well, depending on size and intended application. In addition, PDA can include a microphone for audio input 808 that is connected to a speech recognition facility (not shown). This therefore provides a further input mechanism for the PDA 808.

Located at the top of the PDA are two additional input/output facilities. The first of these comprises a bar code scanner 805, and allows the PDA to check the bar code on components such as a FRU (as previously described). The second component is a wireless communication mechanism for local data exchange with a computer system, such as one at the customer location that is to be serviced (as per the flowchart of FIG. 7). In one embodiment this comprises an infra-red (IR) link 806, for example supporting an IrDA communication facility.

It will be appreciated that the individual components of PDA 280 are well-known to the skilled person, and so will not be described further (even if their collection together into a single device is not necessarily known). Furthermore, the PDA 280 typically includes additional internal components (not shown in FIG. 8) to support and run the desired application and control software. Such internal components generally include a processor unit for executing code, a semiconductor memory for temporary storage of code and data to be manipulated by the processor, and a facility for non-volatile storage of code and data, such as a ROM and a hard disk drive. Again, such components per se are well-known in the art.

The skilled person will also appreciate that the various components shown in FIG. 8 may be omitted, replaced or supplemented in other implementations. For example, the bar code scanner 805 may be regarded as optional, with some embodiments relying on hand input by the user of this data. In other implementations, some common wired link, such as Ethernet or USB, could be provided instead of the infrared link 806, or alternatively a different form of wireless link such as Bluetooth could be supported (of course, multiple such communications facilities might be present). In addition, the PDA 280 shown in FIG. 8 does not include any support for the Global Positioning System (GPS) or for voice (rather than data) conversations over a mobile network, but one or both of these facilities could be incorporated into other implementations. PDA may also be equipped with a variety of other facilities sometimes found on PDAs or other mobile computing devices, such as audio output, CD ROM or DVD input, a floppy disk drive, PCMCIA card support, and so on. It will be appreciated that such components are not of direct relevance to an understanding of the service process as presented herein, but could certainly be exploited for such purposes if included on the particular PDA supplied to an engineer.

In conclusion therefore, a variety of particular embodiments have been described in detail herein, but it will be appreciated that this is by way of exemplification only. The skilled person will be aware of many further potential modifications and adaptations that fall within the scope of the claimed invention and its equivalents.

What is claimed is:

1. A method of performing a service operation on a computer comprising the steps of:
   receiving at a support centre from the computer via a first network interface, information indicative of the need for a service operation;
   identifying a service operation to be performed based on the information received from the computer;
   forwarding control information from the support center to the computer via the first network interface;
   forwarding via a second network interface a task record for the service operation from the support centre to a mobile computing device associated with an engineer who is to perform the service operation; and
   prior to commencement of the service operation on the computer, establishing a local communication link between the computer and the mobile computing device, and confirming the service operation to be performed using data transmitted over said link.

2. The method of claim 1, wherein the service operation to be performed comprises the replacement by the engineer of a particular component of the computer.

3. The method of claim 2, further comprising the step performed by the support centre of interacting with a stock control system to confirm the availability of a replacement for said particular component.

4. The method of claim 2, further comprising the step performed by the mobile computing device of verifying the identity of a replacement component obtained by the engineer against information included in the task record.

5. The method of claim 4, wherein said step of verifying includes scanning a bar code on the replacement component to ascertain its identity.

6. The method of claim 1, further comprising the step performed by the support centre of assigning the service operation to said engineer out of a plurality of possible engineers, said assignment being made on the basis of one or more predetermined criteria.

7. The method of claim 1, further comprising the step performed by the support centre of using diary information from the mobile computing device to schedule the service operation for said engineer.

8. The method of claim 1, wherein said step of confirming includes verifying authorisation information in the mobile computing device against information provided to the computer from the support centre for that service operation.

9. The method of claim 1, further comprising the step performed by the mobile computing device of sending a confirmation back to the support centre once the service operation has been completed.

10. The method of claim 9, wherein said confirmation is not sent until the mobile computing device has received notification from the computer that the service operation performed has been successfully tested.

11. The method of claim 9, wherein said confirmation is not sent until the customer has entered electronic verification into the mobile computing device that the service operation has been successfully completed.

12. The method of claim 1, wherein the mobile computer device receives information from the computer over said communications link to assist the engineer with the service operation.

13. The method of claim 1, wherein said information indicative of the need for a service operation is received at the computer from the support centre over a wide area network.

14. A method of running a support centre to control a service operation to be performed on a computer, the method comprising the steps of: receiving via a first network interface at the support centre from the computer information indicative of the need for a service operation;
identifying a service operation to be performed based on the information received from the computer;
forwarding a task record via a second network interface for the service operation from the support centre to a mobile computing device associated with an engineer who is to perform the service operation; and
transmitting control information from the service center via the first network interface about the service operation to the computer for comparison with the task record on the mobile computing device, in order to allow the computer to confirm that the correct service operation is to be performed by the engineer.

15. The method of claim 14, wherein the service operation to be performed comprises the replacement by the engineer of a particular component of the computer, and said method further comprises the step of interacting with a stock control system to confirm the availability of a replacement for said particular component.

16. The method of claim 14, further comprising the steps of:
accessing diary information for one or more engineers who could possibly perform said service operation; and
scheduling the service operation for a particular engineer in accordance with said diary information.

17. The method of claim 14, further comprising the step of receiving confirmation that the service operation has been completed from at least one of said computer and said mobile computing device.

18. A method of using a mobile computing device to support a service operation on a computer, the mobile computing device being associated with an engineer who is to perform the service operation, said method comprising the steps of:
receiving a task record for the service operation transmitted from a support centre over a first network, wherein at least a portion of said task record can be matched with data transmitted from the support centre over a second network and received by said computer;
prior to commencement of the service operation on the computer, establishing a local communication link between the computer and the mobile computing device, and using said communications link to match said portion of the task record against the data available on said computer in order to confirm the service operation to be performed; and
sending a confirmation back to the support centre over the first network once the service operation has been completed.

19. The method of claim 18, wherein said first network is a cellular telephone network.

20. The method of claim 18, wherein said local communication link between the computer and the mobile computing device is an infrared link.

21. The method of claim 18, wherein the service operation to be performed comprises the replacement by the engineer of a particular component of the computer, and the method further comprises the step of verifying the identity of a replacement component to be used in the service operation against information included in the task record.

22. The method of claim 21, wherein said step of verifying includes scanning a bar code on the replacement component to ascertain its identity.

23. The method of claim 18, wherein said step of using said communications link to match said portion of the task record against the data available on said computer includes verifying authorisation information in the mobile computing device against information provided to the computer from the support centre for that service operation.

24. The method of claim 18, wherein the step of sending said confirmation back to the support centre is delayed until the mobile computing device has received notification from the computer that the service operation performed has been successfully tested.

25. The method of claim 18, wherein the step of sending said confirmation back t the support centre is delayed until the customer has entered electronic verification into the mobile computing device that the service operation has been successfully completed.

26. The method of claims 18, further comprising the step of receiving information from the computer over said communications link to assist the engineer with the service operation.

27. The method of claim 26, wherein the received information includes the deconfiguration status of a component to be replaced in said service operation.

28. A method of controlling a service operation on a computer comprising the steps of:
forwarding via a first network interface a task record for the service operation from a support center to a mobile computing device associated with an engineer who is to perform the service operation;
forwarding via a second network interface information about the service operation from the support centre to the computer; and
prior to commencement of the service operation on the computer, establishing a local communication link between the computer and the mobile computing device, and confirming data from the task record against the information received by the computer from the support centre.

29. The method of claim 28, wherein the service operation to be performed comprises the replacement by the engineer of a particular component of the computer, and said method further comprises the step of verifying the identity of a replacement component against at least one of data included in the task record and the information received at the computer from the support centre.

30. The method of claim 28, further comprising the step of receiving a confirmation at the support centre from the mobile computing device once the service operation has been completed.

31. Apparatus for controlling a service operation to be performed on a computer comprising:

a support centre including:
  a first network interface for receiving information from the computer indicative of the need for a service operation and for transmitting control information about the service operation to said computer;
  a database of technical data for identifying a service operation to be performed based on the received information; and
  a second network interface;
a mobile computing device including a third network interface, for connection to the second network interface of the support centre, for receiving a task record for the service operation from the support centre; and
a fourth network interface for establishing a local communication link between the computer and the mobile computing device in order to allow the service operation to be verified prior to its commencement.

32. The apparatus of claim 31, wherein the mobile computing device further includes a bar scanner for verifying the identity of a component to be replaced during the service operation.

33. The apparatus of claim 31, wherein the support centre includes a scheduler for generating the task record.

34. The apparatus of claim 33, wherein the mobile computing device further includes a diary facility, and said service task is scheduled into said diary facility.

35. The apparatus of claim 31, wherein the mobile computing device further includes an authorisation facility, which operates over the local communication link with the computer.

36. The apparatus of claim 31, wherein the mobile computing device uses said third network interface to transmit a confirmation that the service operation has been completed back to the support centre.

37. The apparatus of any of claims 28 to 33, wherein said local communication link is an infrared link.

38. A support centre for controlling a service operation to be performed on a computer, the support centre including:
  means for receiving at the support centre from the computer information indicative of the need for a service operation;
  means for identifying a service operation to be performed based on the information received from the computer;
  means for forwarding a task record for the service operation from the support centre to a mobile computing device associated with an engineer who is to perform the service operation; and
  means for transmitting control information about the service operation from the support center to the computer for comparison with the task record on the mobile computing device, in order to allow the computer to confirm that the correct service operation is to be performed by the engineer.

39. A support centre for controlling a service operation to be performed on a computer, the support centre including:
  a first network interface operable to connect to said computer to allow receipt of information indicative of the need for a service operation from the computer;
  a scheduler operable to generate a task record for the service operation to be performed in accordance with the information received from the computer;
  a second network interface operable to connect to a mobile computing device associated with an engineer who is to perform the service operation; and
  logic operable to download from the support centre the task record onto the mobile computing device via the second network interface, and to download control information about the service operation to the computer via the first network interface, wherein a comparison between the task record on the mobile computing device and the control information on the computer can confirm that the correct service operation is to be performed by the engineer.

40. The support centre of claim 39, wherein the service operation to be performed comprises the replacement by the engineer of a particular component of the computer, wherein said apparatus interacts with a stock control system to confirm the availability of a replacement for said particular component.

41. The support centre of claim 39, wherein said scheduler interacts with diary information for one or more engineers who could possibly perform said service operation, and schedules the service operation for a particular engineer in accordance with said diary information.

42. A mobile computing device to support a service operation on a computer, the mobile computing device being associated with an engineer who is to perform the service operation, said device comprising:
  means for receiving a task record for the service operation from a support centre over a first network, wherein at least a portion of said task record can be matched with data transmitted from said support centre via a second network interface to said computer;
  means for establishing, prior to commencement of the service operation on the computer, a local communication link between the computer and the mobile computing device, and using said communications link to match said portion of the task record against the data available on said computer in order to confirm the service operation to be performed; and
  means for sending a confirmation back to the support centre over the first network once the service operation has been completed.

43. A mobile computing device to support a service operation on a computer, the mobile computing device being associated with an engineer who is to perform the service operation, said device comprising:
  a cellular telephone interface to establish a connection to a support centre;
  a diary facility for storing a task record for the service operation, wherein the task record is received from the support centre over the cellular telephone interface;
  a communications interface for establishing a local link with the computer to be serviced, wherein said local link is used to match said task record against data transmitted from said support centre via a network interface to the computer, in order to confirm the service operation to be performed.

44. The device of claim 43, wherein said local link the computer and the mobile computing device is an infrared link.

45. The device of claim 43, wherein the service operation to be performed comprises the replacement by an engineer of a particular component of the computer, and the device further includes a reader for automatically verifying data on the replacement component to be used in the service operation against information included in the task record.

46. The device of claim 45, wherein said reader comprises a bar code scanner.

47. The device of claim 43, further comprising a security mechanism for transmitting authorisation data to the computer over said local link.

48. The device of claim 43, wherein a confirmation is sent back to the support centre once the mobile computing device has received notification from the computer that the service operation has been successfully completed.

49. The device of claim 43, further comprising a display for graphically depicting information received from the computer over said local link to assist the engineer with the service operation.

50. The device of claim 43, wherein the diary facility includes the ability to synchronise diary information with the support centre.

51. A support centre for controlling a service operation to be performed on a computer, the support centre including:
- a cellular telephone interface for connection to a mobile computing device belonging to an engineer to perform said service operation;
- a first network interface for connection to the computer to be serviced;
- a software scheduler for generating a service task record corresponding to said service operation for transmission over the cellular telephone interface to said mobile computing device, and information for transmission over said first network interface to the computer to be serviced; and
- a memory system for storing records about outstanding service operations, wherein a record is closed upon receipt of confirmation over said cellular telephone interface that the service operation has been successfully completed, said confirmation being conditional on said task record corresponding correctly to the information transmitted over the first network interface to the computer to be serviced.

52. A computer program product comprising program instructions which when loaded into one or more machines for execution cause said one or more machines to implement a service operation on a computer by performing the steps of:
- receiving at a support centre from the computer information indicative of the need for a service operation;
- identifying a service operation to be performed based on the information received from the computer,
- forwarding a task record for the service operation from the support centre to a mobile computing device associated with an engineer who is to perform the service operation; and
- prior to commencement of the service operation on the computer, establishing a local communication link between the computer and the mobile computing device, and confirming the service operation to be performed using data transmitted over said link.

53. A computer program product comprising program instructions which when loaded for execution into one or more machines at a support centre cause said one or more machines to manage a service operation on a computer by performing the steps of:
- receiving at the support centre from the computer information indicative of the need for a service operation;
- identifying a service operation to be performed based on the information received from the computer,
- forwarding a task record for the service operation from the support centre to a mobile computing device associated with an engineer who is to perform the service operation; and
- transmitting control information about the service operation to the computer for comparison with the task record on the mobile computing device, in order to allow the computer to confirm that the correct service operation is to be performed by the engineer.

54. The computer program product of claim 53, wherein the service operation to be performed comprises the replacement by the engineer of a particular component of the computer, and said program instructions further cause the support centre to perform the step of interacting with a stock control system to confirm the availability of a replacement for said particular component.

55. The computer program product of claim 53, wherein said program instructions further cause the support centre to perform the steps of:
- accessing diary information for one or more engineers who could possibly perform said service operation; and
- scheduling the service operation for a particular engineer in accordance with said diary information.

56. The computer program product of claim 53, wherein said program instructions further cause the support centre to perform the step of receiving confirmation that the service operation has been completed from at least one of said computer and said mobile computing device.

57. A computer program product comprising program instructions which when loaded for execution into a mobile computing device cause said device, when used for a service operation on a computer, to perform the steps of:
- receiving a task record for the service operation from a support centre over a first network, wherein at least a portion of said task record can be matched with data available on said computer;
- prior to commencement of the service operation on the computer, establishing a local communication link between the computer and the mobile computing device, and using said communications link to match said portion of the task record against the data available on said computer in order to confirm the service operation to be performed; and
- sending a confirmation back to the support centre over the first network once the service operation has been completed.

58. The computer program product of claim 57, wherein said first network is a cellular telephone network.

59. The computer program product of claim 57, wherein said local communication link between the computer and the mobile computing device is an infrared link.

60. The computer program product of claim 57, wherein the service operation to be performed comprises replacement by the engineer of a particular component of the computer, and the program instructions further cause the device to perform the step of verifying the identity of a replacement component to be used in the service operation against information included in the task record.

61. The computer program product of claim 60, wherein said step of verifying includes scanning a bar code on the replacement component to ascertain its identity.

62. The computer program product of claim 57, wherein said step of using said communications link to match said portion of the task record against the data available on said computer includes verifying authorisation information in the mobile computing device against information provided to the computer from the support centre for that service operation.

63. A computer program product comprising program instructions which when loaded for execution into one or more machines at a support centre cause said one or more machines to manage a service operation on a computer by performing the steps of:

forwarding a task record for the service operation from a support centre to a mobile computing device associated with an engineer who is to perform the service operation;

forwarding information about the service operation from the support centre to the computer; and prior to commencement of the service operation on the computer, establishing a local communication link between the computer and the mobile computing device, and confirming data from the task record against the information received by the computer from the support centre.

64. The computer program product of claim 63, wherein the service operation to be performed comprises the replacement by the engineer of a particular component of the computer, and said program instructions cause the support centre to further perform the step of verifying the identity of a replacement component against at least one of data included in the task record and the information received at the computer from the support centre.

65. A method of operating a support centre for controlling a service operation to be performed on a computer, said method comprising the steps of:

storing records about outstanding service operations;

providing a cellular telephone interface for connection to a mobile computing device belonging to an engineer to perform said service operation;

providing a first network interface for connection to the computer to be serviced; transmitting a service task record corresponding to said service operation over the cellular telephone interface to said mobile computing device;

transmitting information corresponding to at least part of said service task record over said first network interface to the computer to be serviced; and receiving confirmation over said cellular telephone interface that the service operation has been successfully completed, said confirmation being conditional on said task record corresponding correctly to the information transmitted over the first network interface to the computer to be serviced; and closing a stored record corresponding to the service operation on receipt of said confirmation.

\* \* \* \* \*